Figure 1:
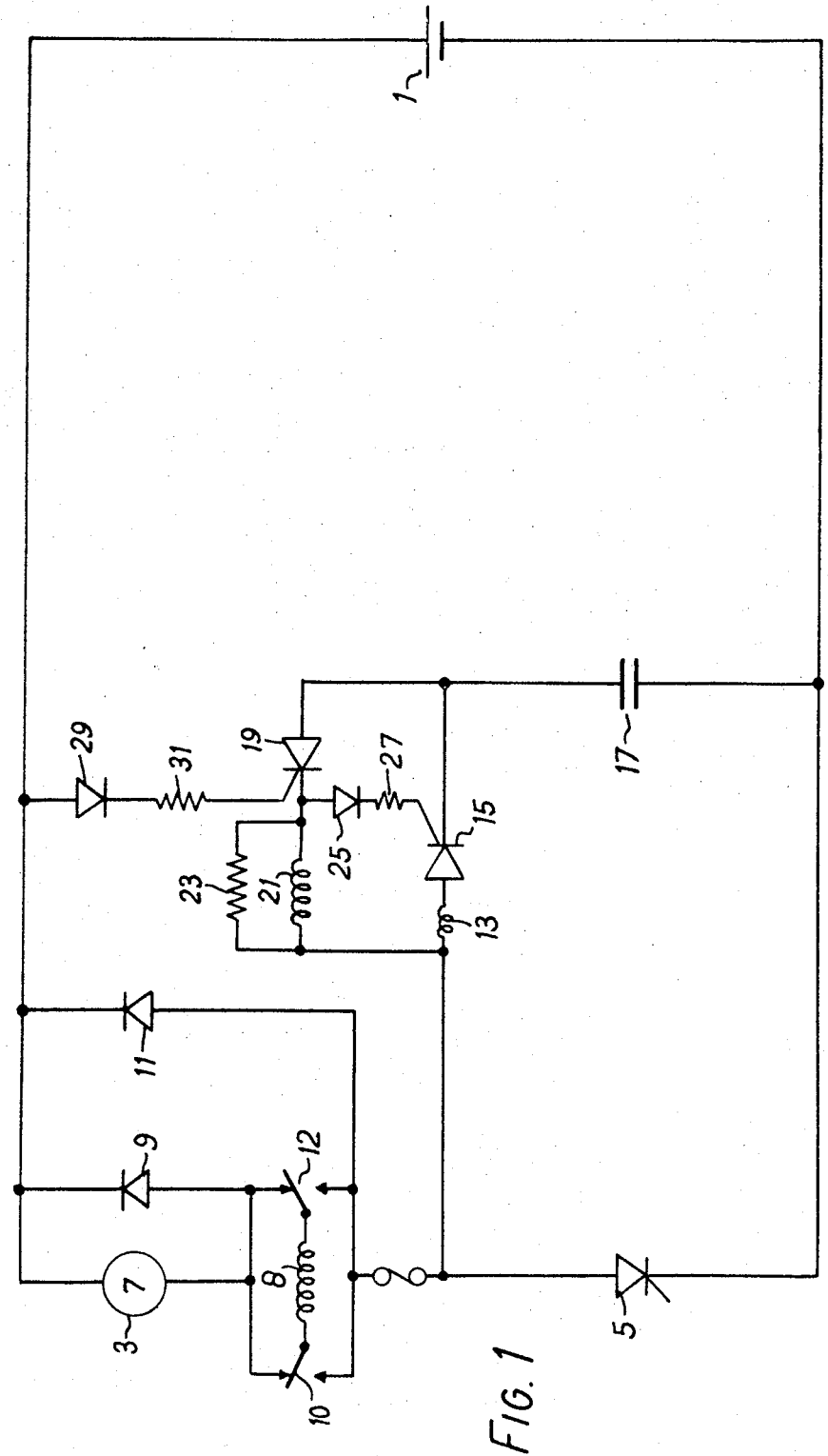

United States Patent [19]
Gurwicz

[11] 3,751,677
[45] Aug. 7, 1973

[54] VARIABLE MARK SPACE RATIO PULSE CONTROLLERS

[75] Inventor: David Gurwicz, Gateshead, England

[73] Assignee: Sevcon Engineering Limited, Durham, England

[22] Filed: May 9, 1972

[21] Appl. No.: 251,821

[52] U.S. Cl. .............................. 307/106, 318/345
[51] Int. Cl. ............................................ H03k 3/00
[58] Field of Search .................... 318/345, 380, 138, 318/139, 341, 354; 307/106, 107, 108

[56] References Cited
UNITED STATES PATENTS
3,365,640  1/1968  Gurwicz .......................... 318/345

Primary Examiner—Herman J. Hohauser
Attorney—Rosen & Steinhilper

[57] ABSTRACT

A variable mark space ratio pulse controller which avoids the use of complex circuitry for triggering the commutating and reversal thyristors, triggering of the reversal thyristor occurring automatically on conduction of the main thyristor and triggering of the commutating thyristor occurring a pre-determined time after initiation of conduction of the main thyristor.

8 Claims, 3 Drawing Figures

VARIABLE MARK SPACE RATIO PULSE CONTROLLERS

This invention relates to variable mark space ratio pulse controllers and more particularly to such controllers for controlling the supply of current from a unidirctional source of supply to a load and of the kind in which a main thyristor serves to connect the source of current supply to the load, a commutating capacitor is provided to commutate the main thyristor, a commutating thyristor is afforded for discharging into and re-charging from the supply the commutating capacitor, and a third thyristor is provided to effect together with the main thyristor charge reversal of the commutating capacitor after charging thereof from the supply by way of the commutating thyristor.

A disadvantage of pulse controllers of the kind referred to is that complex electronic control circuitry is employed not only for the main thyristor but also for the commutating and third thyristors to ensure triggering into conduction at the appropriate times of the thyristors. It is accordingly an object of the present invention to provide a variable mark space ratio pulse controller of the kind set forth which employs simplified control circuitry and can accordingly be provided at reduced cost.

The present invention consists in a variable mark space ratio pulse controller for controlling the supply of current from a unidirectional source of supply to a load, the pulse controller being of the kind in which a main thyristor serves to connect the source of current supply to the load, a commutating capacitor is provided to commutate the main thyristor, a commutating thyristor is afforded for discharging into and re-charging from the supply the commutating capacitor and a third thyristor is provided to effect together with the main thyristor charge reversal of the commutating capacitor after charging thereof from the supply by way of the commutating thyristor, wherein circuit means are provided which on connection of the supply with the load when the commutating capacitor is uncharged automatically render the commutating thyristor conducting to effect forward charging of the commutating capacitor and which when the commutating capacitor is charged automatically cause potentials to be applied to the third thyristor so that conduction thereof occurs on pulsing of the main thyrsitor into conduction thereby to effect charge reversal of the commutating capacitor which causes the commutating thyristor to be automatically rendered conducting so as first to discharge the commutating capacitor and commutate the main thyristor and then to forward charge the commutating capacitor.

Figure 2:
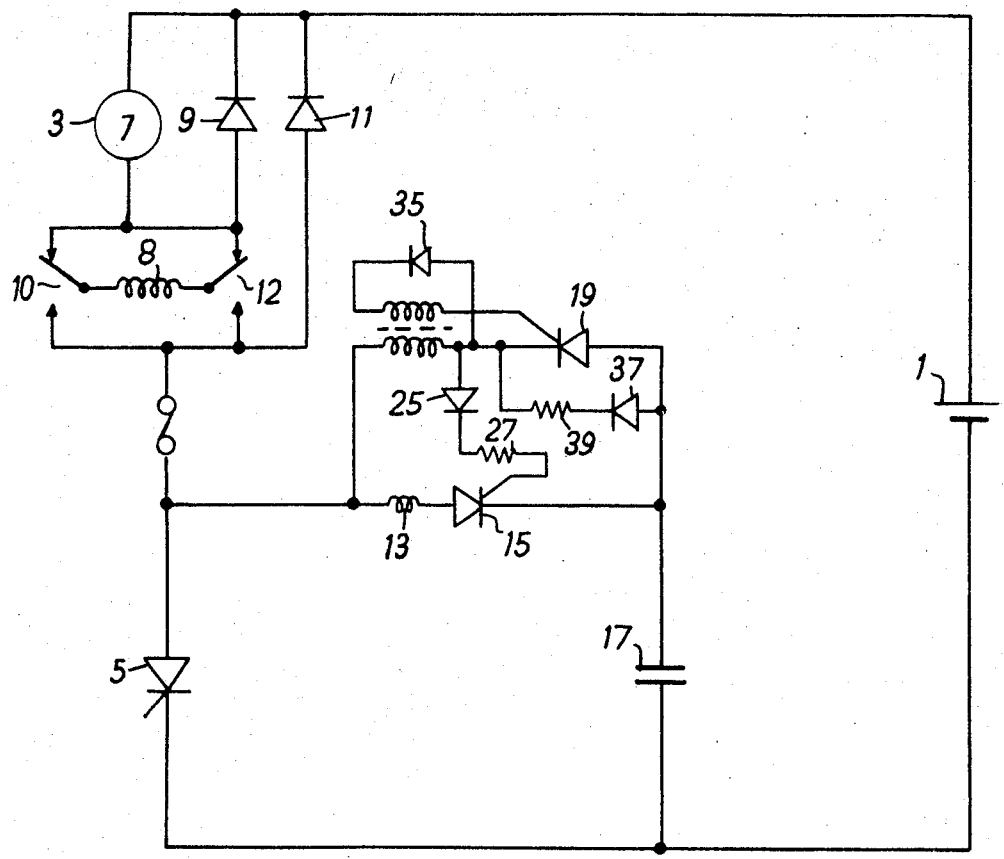
Figure 3:
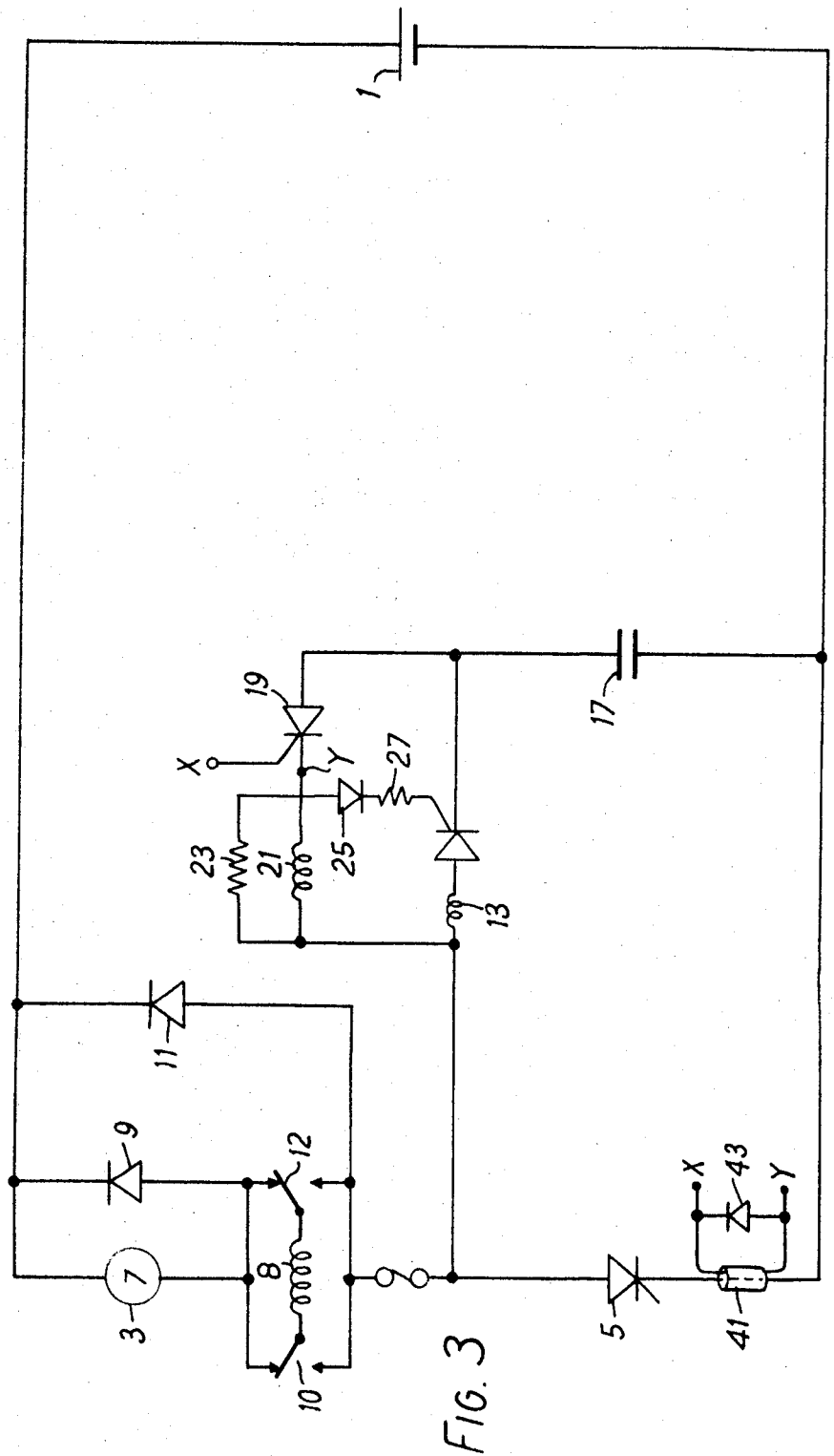

The invention will now be described by way of example with reference to the accompanying drawings, in which:

FIG. 1 is a circuit diagram of a variable mark space ratio pulse controller in accordance with the invention for controlling the supply of current from a unidirectional source of supply to a load, and, FIGS. 2 and 3 illustrate modifications of the circuit of FIG. 1.

Throughout the drawings, like parts have been accorded the same reference numerals.

Referring to FIG. 1, a variable mark space ratio pulse controller comprises a unidirectional source of current supply in the form of a battery 1, which is connected to an inductive load comprising a D.C. series motor 3 by means of a main thyristor 5. The motor has armature 7 shunted in known manner by a plugging diode 9 and a further diode 11, the "free wheel" diode, shunts in known manner the series arrangement of the armature 7 and field coils 8 of the motor. The motor field coils 8 are connected in series with the armature 7 by operation of one of contactors 10 and 12 which provide for forward or reverse drive of the armature. Connected in parallel with the main thyristor is a series path comprising a small inductor 13, a commutating thyristor 15 and a commutating capacitor 17. The anode of the commutating thyristor connects via the small inductor with the anode of the main thyristor whilst the cathode of the main thyristor and one side of the commutating capacitor connect with the negative side of the battery supply the positive side of which connects with the motor armature.

Connected in parallel with the small inductor 13 and the commutating thyristor 15 is a third thyristor 19 in series with a further inductor 21 which is shunted by a resistor 23. The anode of the third thyristor connects with the common point of the cathode of the commutating thyristor 15 and the commutating capacitor 17. The cathode of the third thyristor is connected to the anode of a diode 25, the cathode of which connects via a resistor 27 with the gate electrode of the commutating thyristor. Also, the gate of the third thyristor is fed from the positive side of the battery by way of a diode 29 and a resistor 31.

In operation, assuming that the commutating capacitor 17 is initially uncharged and that the field coils 8 have been connected in series with the motor armature 7 by actuation of one or other of contactors 10 and 12, the gate electrode of the commutating thyristor is subject to a positive potential by way of the battery 1, the armature 7 and field coils 8 the further inductor 21 and the diode 25 and resistor 27 in series therewith. The commutating thyristor thus conducts and the commutating capacitor charges to battery potential or a little above. At this time the commutating thyristor 15 ceases to conduct but the anode of the third thyristor 19 is at the positive potential attained by the commutating capacitor 17 and the gate of that thyristor has a positive potential applied thereto via the resistor 29 and diode 31 in series therewith. Accordingly, as soon as the main thyristor 5 is rendered conducting the third thyristor 19 also conducts, because its cathode potential is pulled down towards the negative potential of the battery and in consequence the commutating capacitor reverse charges (the capacitor plate connected to the third thyristor being depressed below battery negative) at which time current flow through the third thyristor 19 ceases and that thyristor is thus commutated. At this time the cathode of the third thyristor 19 is positive with respect to the gate of the commutating thyristor 15 and, since the capacitor plate connected to the third thyristor is below battery negative potential, the commutating thyristor is again rendered conducting whereupon the commutating capacitor discharges into the battery, commutates the main thyristor and is inductively re-charged in the forward direction to above battery voltage. Thus the third thyristor is put into the state that it conducts immediately the main thyristor conducts and so the cycle of operations is sustained. It will be apparent that the duration of the current pulse through the main thyristor depends on the time constant of the commutating capacitor and the further inductor 21. The small inductor 13 acts to limit the rate of change of current through the commutating thyristor.

The resistor 31 in series with the gate of the third thyristor is a relatively high wattage resistor and this may be avoided by the alternative circuit of FIG. 2 in which the further inductor constitutes the primary winding of a transformer 33 the common point of which and the cathode of the third thyristor connects by way of a diode 35 and the secondary winding of the transformer with the gate of the third thyristor. (A further diode 37 in series with a further resistor 39 shunt the anode to cathode path of the third thyristor). Thus on conduction of the main thyristor current flows from the commutating capacitor via the further diode 37 and further resistor 39 shunting the third thyristor and via the transformer primary winding so that a pulse appears in the secondary winding of the transformer which triggers the third thyristor into conduction.

In the circuit of FIG. 3, the diode 29 and the high wattage resistor 31 are not employed, instead a pulse transformer 41 is provided, the primary of which is formed by part of the circuit connecting the cathode of the main thyristor 5 to the common point of the commutating capacitor 17 and the negative side of the battery 1. Transformer 41 may comprise a toroidal ferrite core on which the transformer secondary winding is wound, this winding being shunted by a diode 43 and connected at its ends X and Y to the gate and cathode respectively of the third thyristor 19. The transformer 41 can alternatively be disposed in the anode path rather than the cathode of the main thyristor 5. It will be apparent that with the arrangement of FIG. 3, upon conduction of the main thyristor 5, a pulse appears in the secondary winding of transformer 41 which switches the third thyristor 19 into conduction.

I claim:

1. A variable mark space ratio pulse controller for controlling the supply of current from a unidirectional source of supply to a load, the pulse controller being of the kind in which a main thyristor serves to connect the source of current supply to the load, a commutating capacitor is provided to commutate the main thyristor, a commutating thyristor is afforded for discharging into and re-charging from the supply the commutating capacitor and a third thyristor is provided to effect together with the main thyristor charge reversal of the commutating capacitor after charging thereof from the supply by way of the commutating thyristor, wherein circuit means are provided which on connection of the supply with the load when the commutating capacitor is uncharged automatically render the commutating thyristor conducting to effect forward charging of the commutating capacitor and which when the commutating capacitor is charged automatically cause potentials to be applied to the third thyristor so that conduction thereof occurs on pulsing of the main thyristor into conduction thereby to effect charge reversal of the commutating capacitor which causes the commutating thyristor to be automatically rendered conducting so as first to discharge the commutating capacitor and commutate the main thyristor and then to forward charge the commutating capacitor.

2. A pulse controller as claimed in claim 1, wherein pulsing of the third thyristor into conduction with conduction of the main thyristor is effected by means of a transformer having its primary in the series path of the main thyristor and its secondary winding connected between the gate and cathode electrodes of the third thyristor.

3. A pulse controller as claimed in claim 2, wherein the transformer primary is connected to the cathode circuit of the main thyristor.

4. A pulse controller as claimed in claim 2, wherein the transformer primary is connected in the anode circuit of the main thyristor.

5. A pulse controller as claimed in claim 1, wherein the commutating thyristor and the commutating capacitor are connected in parallel with the main thyristor and the third thyristor has its anode connected to the common point of the commutating thyristor and commutating capacitor whilst its cathode is connected by way of circuit elements to gate and anode electrodes of the commutating thyristor said circuit elements placing the commutating thyristor in a conducting state when the supply is connected with the load at a time when the commutating capacitor is uncharged.

6. A pulse controller as claimed in claim 5, wherein the circuit elements include an inductor connecting the cathode of the third thyristor to the anode of the commutating thyristor and a series arrangement of a diode and a resistor connecting the gate of the commutating thyristor with the cathode of the third thyristor.

7. A pulse controller as claimed in claim 6, wherein the gate electrode of the third thyristor is connected by a series arrangement of a diode and a resistor with the positive side of the supply.

8. A pulse controller as claimed in claim 5, wherein the inductor constitutes the primary winding of a pulse transformer the secondary winding of which is connected in series with a diode between the gate and cathode electrodes of the third thyristor.

* * * * *

UNITED STATES PATENT OFFICE
CERTIFICATE OF CORRECTION

Patent No. 3,751,677          Dated August 7, 1973

Inventor(s) David Gurwicz

It is certified that error appears in the above-identified patent and that said Letters Patent are hereby corrected as shown below:

On the title page insert:

-- [30] Foreign Application Priority Data

May 14, 1971      Great Britain      14963/71      --.

Signed and Sealed this

Twenty-second Day of March 1977

[SEAL]

Attest:

RUTH C. MASON
*Attesting Officer*

C. MARSHALL DANN
*Commissioner of Patents and Trademarks*